March 6, 1934.  E. M. FRASER  1,949,860
POWER TRANSMITTING SYSTEM
Filed Aug. 5, 1932  4 Sheets-Sheet 1

INVENTOR
Ethelbert M. Fraser
BY
Watson, Bristol, Johnson & Leavenworth
ATTORNEYS March 6, 1934. E. M. FRASER 1,949,860
POWER TRANSMITTING SYSTEM
Filed Aug. 5, 1932 4 Sheets-Sheet 2
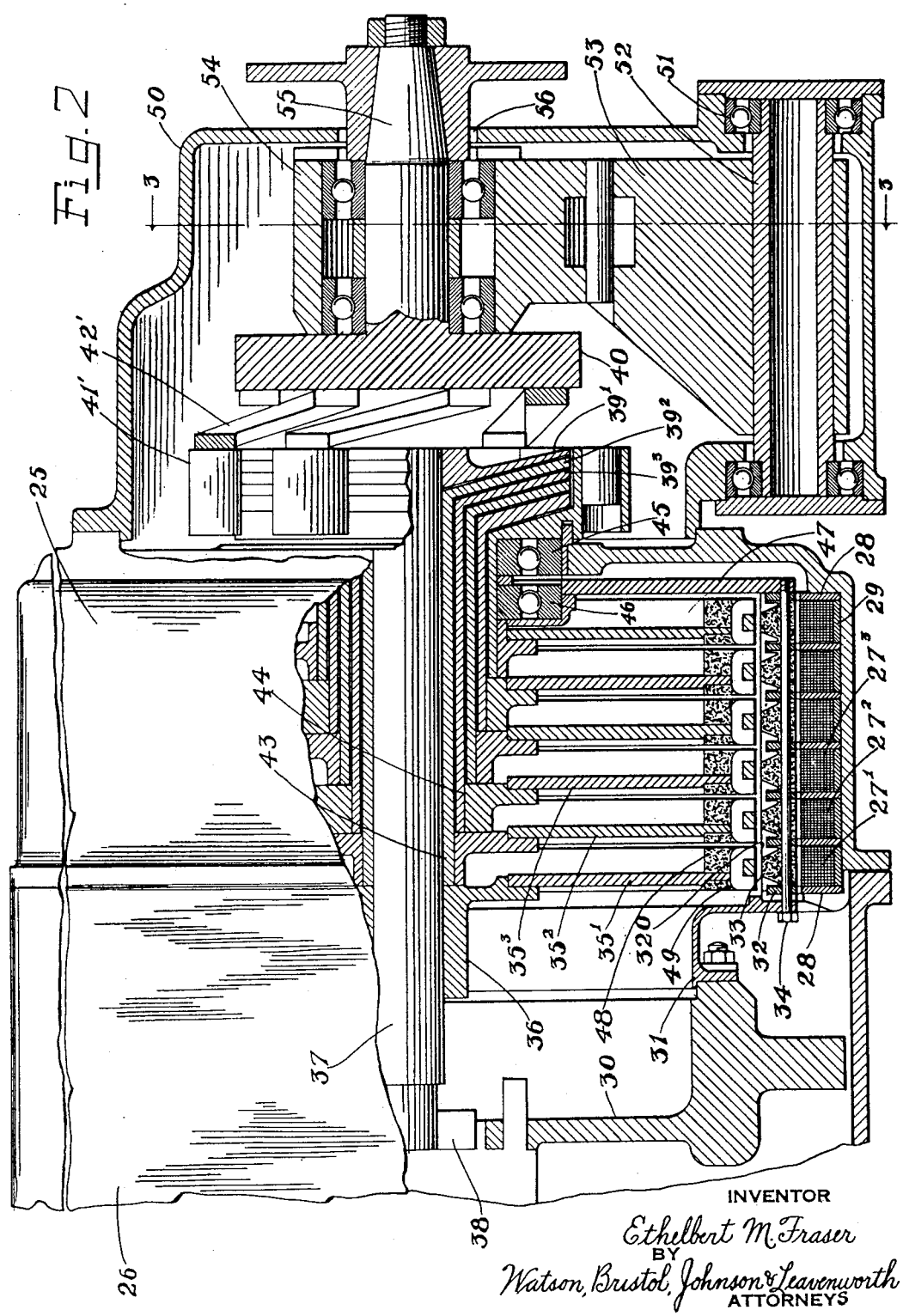
INVENTOR
Ethelbert M. Fraser
BY
Watson, Bristol, Johnson & Leavenworth
ATTORNEYS

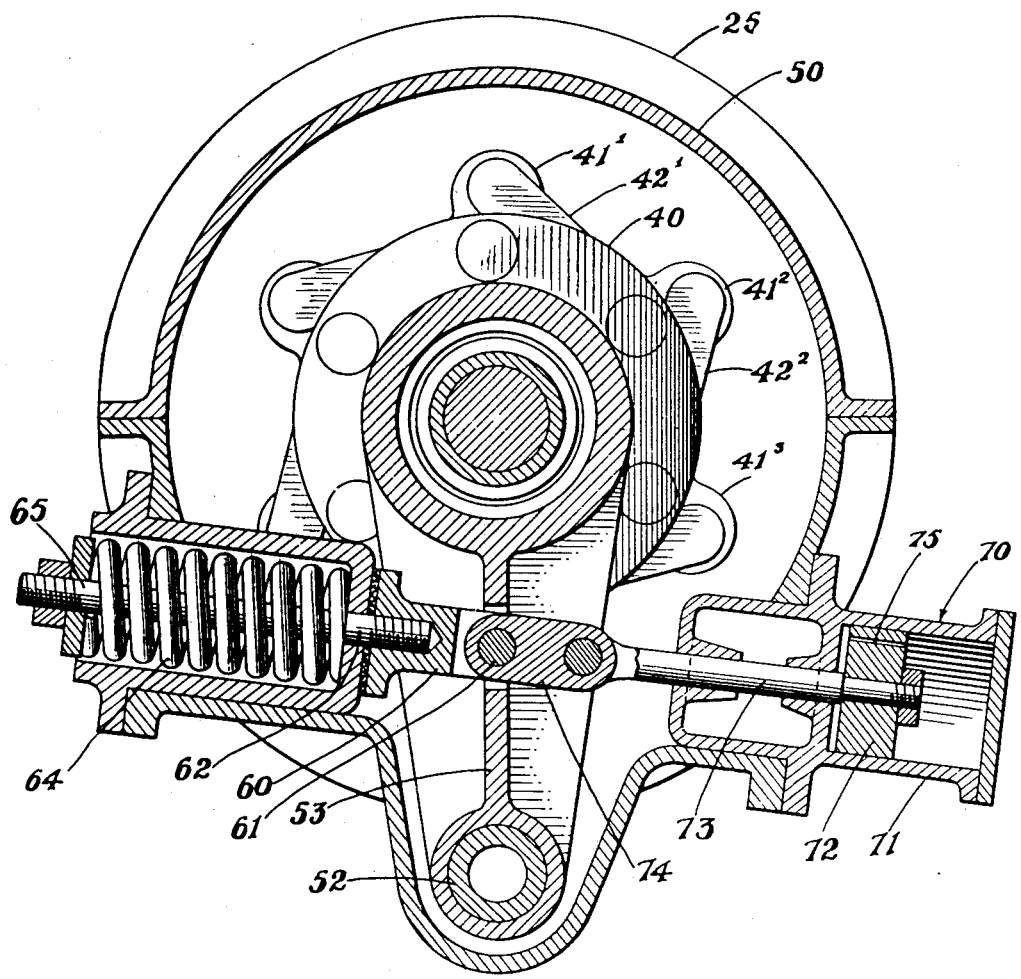

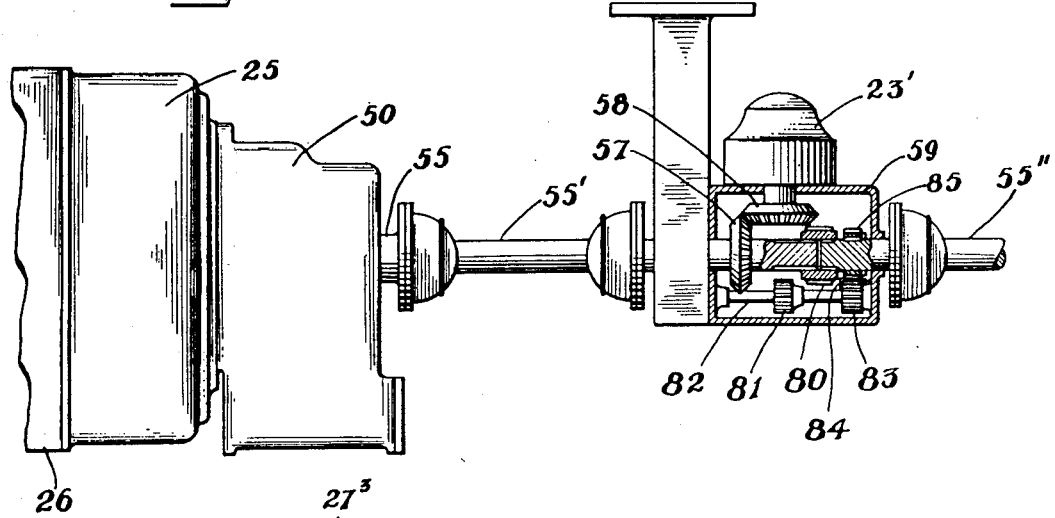
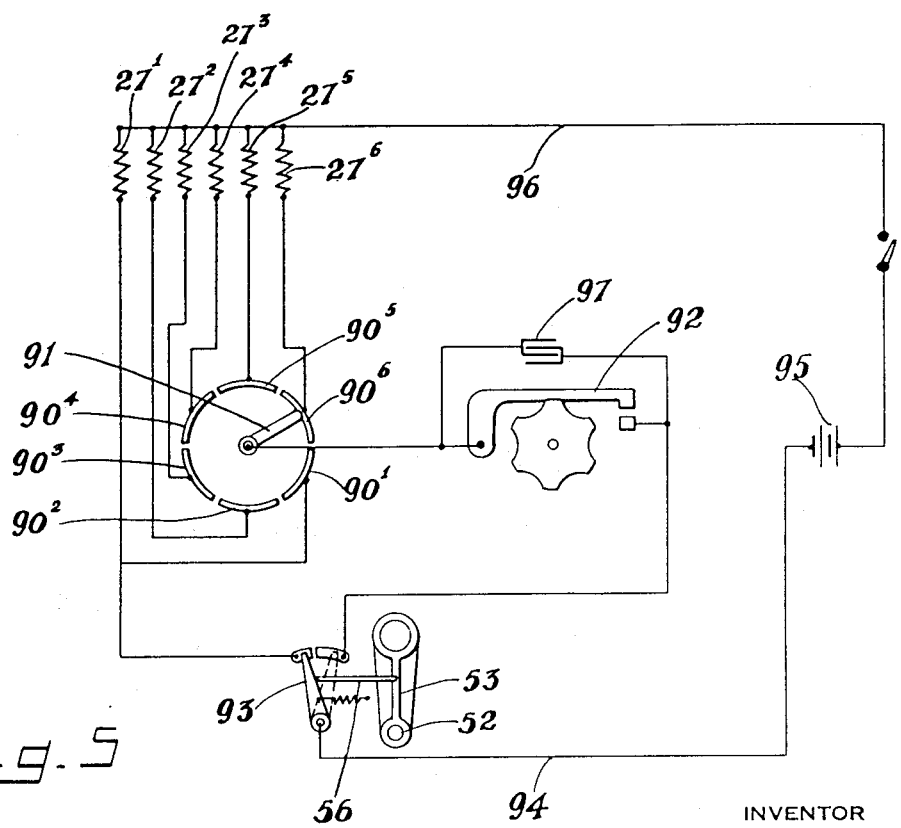

Patented Mar. 6, 1934

1,949,860

UNITED STATES PATENT OFFICE 1,949,860

POWER TRANSMITTING SYSTEM

Ethelbert M. Fraser, Yonkers, N. Y., assignor to The Fraser Company, Inc., Dover, Del., a corporation of Delaware Application August 5, 1932, Serial No. 627,575

19 Claims. (Cl. 74—14)

This invention relates to power-transmitting systems and particularly to transmission systems of the character employed in automotive vehicles.

The invention has for its object generally the provision of an improved transmitting system of the character indicated which is highly efficient, has an infinite gradation of speeds between high and low speeds and is readily manufactured.

More specifically, it is an object of the invention to provide a power transmitting system which utilizes the principle of differential arc-displacements to obtain variation in the ratio of transmission-speeds instead of the usual ratio-changing gears.

Another object is to provide a transmission system which employs axially displaceable shafts to obtain the mechanical shift that results in differential arc-displacements to effect change in the ratio of transmission-speeds.

Another object is to provide an improved arrangement in transmitting systems of the character indicated for interlocking the parts electromagnetically, and for selecting the arc portion through which torque is transmitted when the parts are moved to the differential driving positions.

Still another object is to provide an arrangement adapted for automatically shifting the power transmission parts to drive differentially at a lower speed when a predetermined torque is exceeded and vice-versa.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 1 is a diagrammatic view partly in section and partly in elevation showing an elementary combination constructed in accordance with the invention;

Fig. 1$^a$ is an explanatory diagram showing a displacement of driving parts employed in Fig. 1 which produces differential driving-arcs for a low-speed ratio transmission of power; while Figs. 1$^b$ and 1$^c$ are similar diagrams showing the parts respectively in intermediate and high speed positions;

Fig. 2 is an enlarged view partly in section and partly in elevation of a transmission system of the present invention adapted for use with an internal combustion motor for driving an automotive vehicle;

Fig. 3 is a vertical sectional view taken on the line 3—3 in Fig. 2;

Fig. 4 is a side elevation of the transmission system, shown in Fig. 3, drawn on a reduced scale; and Fig. 5 is a wiring diagram showing conventionally the system for electrically selecting the electro-magnetically interlocked driving parts employed by the invention.

Figure 1:
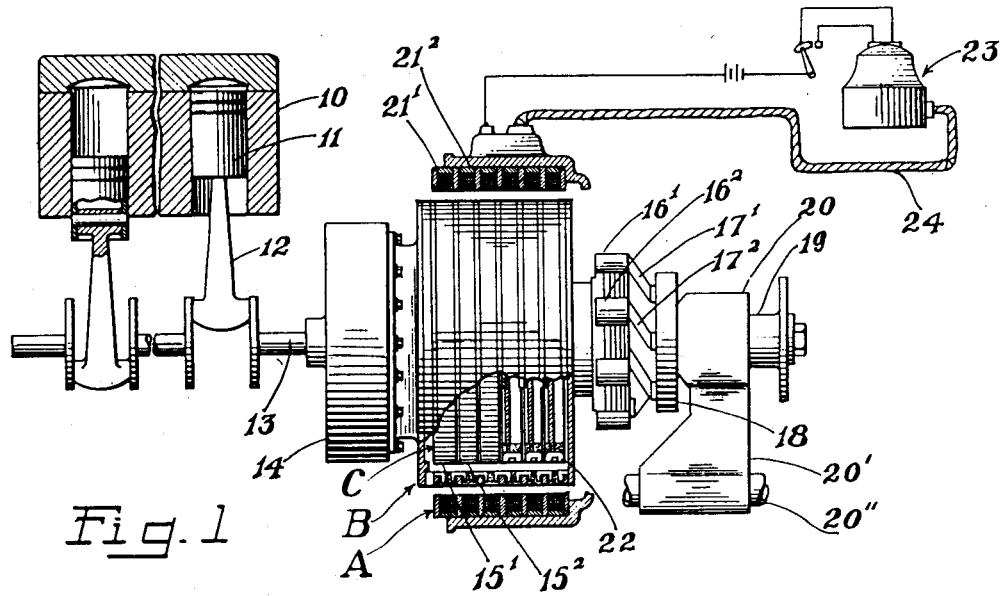
Figure 1A:
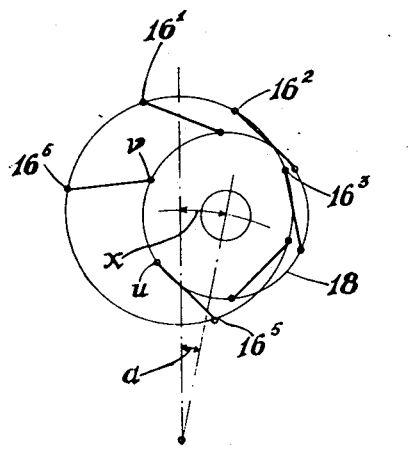
Figure 1B:
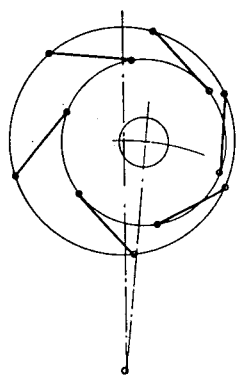
Figure 1C:
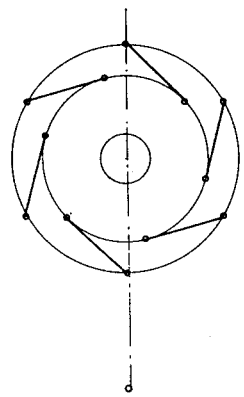

Referring now to the drawings, and particularly to Fig. 1, 10 denotes a cylinder block having one or more reciprocating pistons 11 connected by connecting rods 12 to cranks on shaft 13 whereby heat energy is converted in motion of rotation in the manner commonly associated with heat-engines, and internal combustion motors in particular.

On the shaft 13 is a fly-wheel 14 that is connected for driving purposes with an intermediate member B which is rotatively disposed within an outer or stationary member A and has independently positioned within it an inner rotating member C. These three members are preferably cylindrical in form and are coaxially arranged; the outer member A being mechanically secured to the same base (omitted from illustration in the interest of clearness) which supports the cylinder block 10. The member B which revolves with the shaft 13 is thus free to turn within the member A without mechanical contact therewith, the driving torque being transmitted from member B to member C by an interlocking electromagnetic action hereinafter more fully described.

The member C is not an integral member, as are the members A and B, but comprises a plurality of parallel torque disks $15^1$, $15^2$, $15^3$, etc. which are coaxially arranged and are mechanically connected to drive respectively cranks $16^1$, $16^2$, $16^3$, etc. which are individually connected by links $17^1$, $17^2$, $17^3$, etc. to the driving disk 18 that is rigidly mounted on a shiftable power transmitting shaft 19. The shifting of the shaft 19 is accomplished by moving its bearing 20 that is carried by a radium member 20' pivoted on a rod 20'', which latter is stationary and carried by the base that supports the cylinder block and member A.

In order to accomplish the electro-magnetic interlocking action between member B and a torque disk of member C, the member A is provided with magnetizing windings that are disposed about the interior of the barrel of member A. The magnetizing windings here employed do not provide one big magnet in member A, but are arranged as a plurality of small magnetizing windings disposed side-by-side, radially outside of the disks $15^1$, $15^2$, $15^3$, etc. Such windings are here shown at $21^1$, $21^2$, $21^3$, etc. and will selectively magnetize the adjacent portion of member B and the magnetic members in a disk at 15 with which it is associated. The member B, while a mechanically integral structure, is built up of magnetic and non-magnetic parts so arranged that the magnetic circuits surrounding the coils $21^1$, $21^2$, $21^3$, etc. are projected into the torque disks $15^1$, $15^2$, $15^3$, etc. and concentrated peripherally at a plurality of points. Cooperating with the magnetic flux, thus concentrated and projected by the structure of the member B, are a plurality of magnetic bridges, shown as U-members 22, disposed in non-magnetic material about the periphery of each torque disk. These bridges are in number and angular displacement about the disks substantially the same as the points of flux concentration in the member B. Thus when a coil in member A is energized electrically, a magnetic circuit permeates the member B and the bridges 22 of a corresponding torque disk placing the parts under tension. The flux which is thus concentrated at a plurality of angularly displaced points prevents the torque disk and the member B from becoming angularly displaced, so that they are effectively interlocked and move as a single mechanical unit as long as the coil remains energized.

The torque disks $15^1$, $15^2$, $15^3$, etc. are separate so that by selectively energizing the coils $21^1$, $21^2$, $21^3$, etc., it is seen that the driving torque of member B may be transmitted selectively through the disks $15^1$, $15^2$, $15^3$, etc., depending upon which coil is energized. This selective driving of the torque disks permits the driving of the disk 18 selectively from the cranks $16^1$, $16^2$, $16^3$, etc.: thus each crank may be arranged to drive the disk 18 for a portion of each revolution. This is accomplished by energizing the coils $21^1$, $21^2$, $21^3$, etc. cyclically, i. e., in a predetermined order for a part of the period of each revolution. A commutator, shown generally at 23, having cable connections 24 leading to the coils $21^1$, $21^2$, $21^3$, etc. is conveniently provided to effect the selective energization of the coils in the manner desired.

In order to accomplish a change in the ratio of transmission-speeds by the principle of differential arc displacements, the radius member 20' is rocked about its pivot so that shaft 19 and its driving disk 18 are moved out of axial alignment with shaft 13, to a displaced position, for example that shown in Fig. 1ª, where the angle $a$ denotes the angle through which the radius member 20' has been displaced to produce a displacement, denoted $x$, between the centers of the cranks and the disk 18. If it be assumed that there are $n$ cranks, the circumference of the disk 18 is divided into $n$ equal arcs, and an equal number of cranks pivotally attached at the termini of arcs, the cranks together with their torque disks being capable of mutually independent displacements.

When the parts are in the position shown in Fig. 1ª, a crank, for example that in the position $16^5$, is made to transmit a thrust through its link to a pivot point on disk 18, for example that shown at $u$. This thrust continues to be transmitted until the crank reaches a predetermined point such as $16^6$ in Fig. 1ª, while the disk is rotated until the pivot point $u$ has reached the position $v$. The angle subtended by arc $uv$ is seen to be $360°/n$. The arc through which the driving crank has turned is seen to be greater than arc $uv$ so that a greater angular displacement is required of the engine than $360°/n$ to transmit power in this position of the parts. The ratio of the transmission speeds is thus seen to be increased from unity to a value in excess of unity depending on the displacement $x$. If $x$ in Fig. 1ª be the maximum displacement mechanically permitted to the parts, then Fig. 1ª shows the position of disk 18 and its driving cranks when in low-speed position.

In Fig. 1ᵇ the displacement $x$ has a value intermediate between zero and the maximum shown in Fig. 1ª. This position of the parts therefore corresponds to a speed intermediate between low-speed and high-speed. It is seen, however, that the position shown in Fig. 1ᵇ is not the only intermediate position of which the parts are susceptible, but instead an infinite number of positions between these limits are possible, so that an infinite gradation of speeds between the low-speed position of Fig. 1ª and the high-speed position of Fig. 1ᶜ is possible; in Fig. 1ᶜ the parts are in coaxial position where the displacement $x$ is zero and the ratio of transmission-speeds is unity.

In the detailed embodiment of the invention shown in Fig. 2, 25 denotes a casing which is bolted or otherwise secured to an engine casing 26 to form a base for rigidly supporting the coils and stationary member (heretofore referred to as A) provided in accordance with the invention. The coils are here shown as six in number, disposed side-by-side in the casing 25 and denoted $27^1$, $27^2$, $27^3$, etc., respectively. These coils are preferably separated by annular magnetic members 28 and have magnetic backing members 29 interposed between them and the wall of casing 25.

Within the casing 26 is an engine fly wheel 30 that is bolted or otherwise rigidly secured to a flange member 31 carrying the intermediate member (heretofore referred to as B). The intermediate member is here shown as composed of a plurality of annular magnetic members 32 spaced apart by means of interposed relatively thick annular members 33 of non-magnetic material. The laminated cylindrical structure thus built-up is secured to the flange 31 in any convenient manner, for example by bolts, as shown at 34. The annular magnetic members 32 are so positioned as to be directly within the magnetic members 28 of the stationary member, but spaced therefrom so that there is a uniform air gap between the same when the intermediate member B is revolved by the engine. The non-magnetic material at 33 interspersed between the magnetic annuli 32 may be of any character adapted to provide a mechanically rigid structure, for example an organic fibrous material impregnated with a phenolic condensation product.

In order to provide a plurality of flux concentrating points about the interior of the intermediate member, the magnetic annuli 32 are each bridged at a plurality of points by magnetic cross-members 320, which somewhat resemble inverted U's. These magnetic U's are preferably embedded in the non-magnetic material so as to become a part of the permanent structure of the intermediate member, these U's preferably having equal angular displacement about the internal periphery of the cylindrical member. These magnetic U's may or may not extend above the general surface level of the interior of the cylindrical intermediate member. In the arrangement shown, these magnetic U's are indicated as turned down to provide a uniform internal cylindrical surface for the intermediate member. The torque disks which comprise the inner member (heretofore denoted C) are indicated respectively at $35^1$, $35^2$, $35^3$, etc. Each of these disks is rigidly secured to a sleeve or hub that turns about a common axis. As here shown, the disk $35^1$ is attached to a hub 36 rigidly secured on a shaft 37 that may have an inner bearing 38 disposed in the center of the fly wheel 30. The other end of the shaft 37 carries a disk $39^1$, which is conveniently arranged to carry one of the cranks that transmit power to the driving disk shown at 40. The crank on disk $39^1$ is shown in the form of a cylindrical lug $41^1$ that is connected by means of a thrust transmitting link $42^1$ to transmit force to the driving disk 40.

The torque disk $35^2$ is rigidly secured to a sleeve that has an extension 43 formed with a working fit over the shaft 37 and is extended to provide a crank disk $39^2$ and $41^2$ adjacent the crank $41^1$. Similarly, the torque disk $35^3$ is rigidly secured to a sleeve 44 that has a working fit over the extension 43 and is extended to provide a crank disk $39^3$ and crank $41^3$ adjacent the crank $41^2$; this construction being repeated to provide a series of adjacent cranks $41^1$, $41^2$, $41^3$, etc. at the end of the shaft 37 remote from the engine, the outermost extension of the sleeve having a bearing 45 in the casing 25 in order properly to support the parts in rotating position; an adjacent bearing 46 being preferably provided for a bearing disk 47 that is shown as secured to the otherwise open end of the intermediate member, whereby all the concentric members are secured in proper rotative position.

In order to provide proper magnetic interlocking action between the torque disks $35^1$, $35^2$, $35^3$, etc., and the intermediate member, the periphery of each torque disk is provided with an enlarged carrying flange 48 of non-magnetic material, in the outer periphery of which is disposed a plurality of magnetic bridges 49 that are shown as embedded in the non-magnetic material in such a manner as to bridge the space between the magnetic members 320 disposed about the interior cylindrical wall of the intermediate member. The magnetic bridges 49 are thus over the coils $27^1$, $27^2$, $27^3$, etc. and form paths for the magnetic flux passing about these coils through the magnetic members of the main stationary member and the intermediate member when the coils are energized. The magnetic bridges disposed in the periphery of the torque disks are preferably the same in number as the magnetic U's 320 and have the same angular displacement about the common axis of the members A, B, and C.

Attached to the casing 25 is an extension 50 which houses the driving disk 40 and the connected crank structure. This extension is shown as provided with bearings 51 for the pivot member 52 of a radius member 53 that is supported thereon and carries a bearing member 54 for a driving shaft 55 that is connected to the driving disk 40, this shaft being adapted to be connected to and be a part of the torque shaft of an automotive vehicle. In order that the shaft 55 may be displaced relatively to the shaft 37 by the radius member 53, the extension casing 50 is provided with an arcuate slot 56 through which the shaft 55 protrudes and in which it is adapted to oscillate from a position coaxial with the shaft 37 to one corresponding to the extreme displaced position indicated in Fig. $1^a$.

In order to effect the shift of the shaft 55 automatically from the position shown in Fig. $1^c$ to either of those shown in Figs. $1^b$ and $1^a$, or vice versa, the radius member 53 is provided with a torque actuated position-controlling device, details of which are shown in Fig. 3. It is here seen to comprise a shifting rod 60, connected by a pivot 61 to a mid-portion of the radius member and having an extension 62 that passes into an auxiliary casing 63. This latter casing is conveniently disposed in a side of the extension casing 50 and provided with a spring 64 that pushes against a washer 65 secured on the end of extension 62. The spring 64 thus applies a certain force to rod 60 which acts on the radius member 53 to produce a torque about the pivot 52 for holding the parts in coaxial position until such torque is exceeded by a counter-torque which is under the control of the propelling motor or engine. This counter-torque is seen to be produced by the reaction of the trusts delivered to the disk 40 through the links $42^1$, $42^2$, $42^3$, etc. that are actuated by the torque disks $35^1$, $35^2$, $35^3$, etc. of the inner member of the transmission system.

The origin of this counter-torque will be readily seen by referring to Fig. $1^a$. Here consider the trust delivered by cranks $16^2$ and $16^5$ to the periphery of disk 18. These thrusts produce a couple that tends to turn the disk about its axis but reacts upon the axis to push it in the direction of the displacement $x$. Thus when the torque delivered by the engine to its crank-shaft exceeds a value determined by the strength of the spring at 64, a counter-torque is developed sufficient to cause a displacement in the direction of $x$ until the force developed by compressing the spring at 64 is counterbalanced. The engine will thereafter deliver its power at reduced effort, but the ratio of transmission-speeds from engine to driving-shaft will have been increased above unity. When the effort of the engine decreases, the spring 64 will automatically extend itself to draw the parts back into coaxial position, i. e., the shifting of the parts from low speed to high speed position and vice-versa is automatic and depends on the torque delivered by the engine.

In order that this shift shall take place in a gradual and uniform manner, without the jarring of the parts, a time-retarding means, for example a dash-pot as shown generally at 70, is linked to the rod 60 to govern its motion. This dash-pot comprises a cylinder 71, in which moves a piston 72 having a rod 73 extending to the outside and linked by a pivotal link 74 with the pivot 61 of the rod 60 to the radius member 53. The cylinder 71 is filled with fluid, the consistency of which determines the rate at which the piston 72 can move within the cylinder; a by-pass 75, here shown as in the piston, is provided to regulate the fluid displacement from one side of the piston 72 to the other when the latter moves.

The transmission system, housed in the casing 25 and the extension 50, is thus seen to comprise a structural unit that may be substituted for the usual gear-transmission unit now commonly found in automotive power systems. An arrangement of this character secured to an engine casing 26 is shown in Fig. 4 where shaft 55', comprising an extension of the shiftable shaft 55, connects with the torque or driving shaft of an automotive vehicle. At some convenient point along this shafting, gearing is connected for driving the commutator that controls the energization of the coils in the stationary member A of the present transmission system. This gearing illustrated comprises a pair of bevel gears 57 and 58 that drive the commutator contained within the housing at 23' on a gear casing 59. This casing may house not only gears 57 and 58 but also the reverse gearing where no provision for the same is made in the primary system. Such reverse gearing may be of any convenient type and is no part of the present invention. In Fig. 4, the reverse gearing is depicted as comprising a shiftable coupling gear 80 that normally couples the shaft 55' with a final portion 55'' of the driving shaft. When slid to the left out of engagement with portion 55'' by a reverse lever, (not shown in the interests of clearness) it moves into mesh with a spur gear 81 on a jack-shaft 82 in the casing 59. This shaft also has a gear 83 that engages a spur gear indicated at 84 as back of the shaft and in mesh with gear 85 on shaft 55''. The direction of rotation of shaft 55'' is thus reversed when gear 80 is out of engagement with the end of shaft 55'' and in mesh with the spur gear 81.

The commutator which is indicated as housed at 23' has a plurality of segments corresponding in number with the coils and cranks in the transmission system when made to execute one revolution in synchronism with each revolution of the driving disk 40. The commutator illustrated in Fig. 5 accordingly has six segments to correspond with the six coils and power delivery cranks shown in Fig. 2. Here the segments $90^1$, $90^2$, $90^3$, etc., are contacted by a moving contactor 91 that is rotated by the gearing 57—58; this contactor being preferably connected in series with a cam-actuated circuit-interruptor 92 and a cut-out switch 93. This latter is arranged to be actuated by the movement of the radius member 53 through a connecting rod or link 56 is connected by a conductor 94 with a suitable source of E. M. F., for example a battery as shown at 95. From the other pole of the battery leads a return conductor 96 which is common to the coils of the stationary member. These coils are here conventionally shown as windings and denoted respectively $27^1$, $27^2$, $27^3$, etc.; each having a conductor leading respectively to the commutator segments $90^1$, $90^2$, $90^3$, etc. Shunted across the interruptor 92 is a suitable spark suppressing device, for example a condenser 97.

The operation of the transmission system shown in Figs. 2 to 5, inclusive, is as follows: Power delivered by the motor or engine is transmitted through the fly wheel 30 to the flange member 31 that carries the intermediate member of the transmission system. When one of the coils at 27 is energized, this causes a magnetic interlocking between the intermediate member and a torque disk at 35. When the engine is started, the coils at 27 are not energized, since this is equivalent to the starting of the engine with the clutch out in the present transmission systems. As soon as a coil at 27 is energized, this causes the engine to transmit its full torque through a selected torque disk at 35 together with its associated crank to the driving disk 40. This when starting generally develops sufficient counter-torque to throw the parts into the position shown in Fig. 1$^a$. In this position, the maximum torque will be delivered from the crank shown at $16^5$ in Fig. 1$^a$, so that the coil which interlocks the corresponding torque disk will be energized. Assuming that this is coil $27^5$ in Fig. 5, and that the cut-out switch 93 is in the dotted line position, it will be seen that the contactor 91 would be in a position to contact with the commutator segment $90^5$. This coil will be energized while the driving disk is turned through the arcuate displacement from $u$ to $v$. The contactor 91 will in the meantime have reached a position to energize a coil $27^4$ which takes up the propulsion of the driving disk through the next succeeding portion of the arc. In this manner, the driving disk is driven successively by the cranks at $16^5$, $16^4$, $16^3$, etc., while the contactor 91 makes a revolution engaging commutator segments $90^5$, $90^4$, etc. When the effort of the engine decreases sufficiently, the counter-torque which effects the displacement $x$ will have decreased so that the parts occupy an intermediate position, as indicated in Fig. 1$^b$. Finally, the parts will assume the position indicated in Fig. 1$^c$ when the parts have become co-axial. In this position, the radius member 53 will operate through the rod 56 to move the cut-out switch 93 to the full line position shown in Fig. 5. In this position the commutator is cut out as well as the interrupter 92, the circuit now including only the battery 95 and the coil $27^1$, which is continuously energized while the cut-out switch is in the full line position, that is, when the transmission is running in the high speed position.

The magnetic flux generated in a coil, for example that shown in $27^1$ in Fig. 2, passes around through the backing members 29, the annular members 28 into those at 32 in the intermediate member, where the U's 320 cause such flux to divide and to concentrate at points about the inner periphery of the intermediate member; from thence the flux streams across the air gap separating the intermediate member from the torque disks at 35 into the magnetic bridges 49. These bridges, as pointed out, provide a flux conducting path in the periphery of the torque disks which interlocks them magnetically with the intermediate member. When the parts are in the coaxial or high speed position, so that the coil $27^1$ is permanently energized, this flux passes through the bridges 49 in the periphery of the torque disk $35^1$, so that power is continuously delivered through the shaft 37 to the crank $41^1$ and thence through the links $42^1$ to the driving disk 40.

In the high speed position, it will be seen that the cranks $41^1$, $41^2$, $41^3$, etc. are equally spaced and revolve with uniform angular velocity, but in an intermediate or low speed position they have unequal angular velocities during different portions of their angular travel, and hence when accelerating and decelerating execute relative oscillating motions, the cranks being unequally spaced and successively occupying the unequally spaced portions shown in Figs. 1$^a$ and 1$^b$ when transmitting driving force at a low or intermediate speed.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In a power transmitting system, the combination comprising a plurality of coaxial torque transmitting members, a driving member, and connecting means between said torque transmitting members and said driving member arranged to permit the same to have their axes relatively displaced.

2. In a power transmitting system, the combination comprising a plurality of coaxial torque transmitting members, a shiftable driving member, and connecting links mechanically connecting each torque transmitting member to said driving member.

3. In a power transmitting system, the combination comprising a plurality of coaxial torque transmitting members, a crank rigidly associated with each of said torque transmitting members, a shiftable driving member, and link-means connecting each crank to said driving member; said cranks being capable of mutual relative oscillation.

4. In a power transmitting system, the combination comprising a plurality of coaxial torque transmitting members, a crank rigidly associated with each of said torque transmitting members, a shiftable driving member, means for shifting said driving member laterally with respect to said cranks, and link-means connecting each crank to said driving member.

5. In a power transmitting system, the combination comprising a plurality of coaxial torque transmitting members, a crank rigidly associated with each of said torque transmitting members, a shiftable driving member, a pivoted radial member having a bearing carrying said driving member, means for angularly displacing said radial member about its pivot to shift said driving member, and link-means connecting each crank to said driving member.

6. In a power transmitting system, the combination comprising a plurality of coaxial torque transmitting members, a crank rigidly associated with each of said torque transmitting members, a shiftable driving member, a pivoted radial member having a bearing carrying said driving member, a torque-actuated position-controlling means connected to said radial member, and link-means connecting each crank to said driving member.

7. In a power transmission system, the combination comprising a power supply member, a plurality of coaxial torque transmitting members, a driving member, link means connecting said torque members respectively to said driving member, means for selectively interlocking a torque transmitting member with said power supply member, and means for displacing relatively the axis of said driving member and that of said torque transmitting members whereby the ratio of their transmission speeds may be altered.

8. In a power transmission system, the combination comprising a power supply member, a plurality of coaxial torque transmitting members, a driving member, link means connecting said torque members respectively to said driving member, electromagnetic means stationarily disposed with reference to said torque transmitting member and adapted to interlock the same magnetically with said power supply member, and means for displacing relatively the axis of said driving member and that of said torque transmitting members.

9. In a power transmission system, the combination comprising a power supply member, a plurality of coaxial torque transmitting members, a driving member, link means connecting said torque members respectively to said driving member, electromagnetic means stationarily disposed with reference to said torque transmitting member and adapted to interlock the same magnetically with said power supply member, a pivoted radial member carrying said driving member, and means for angularly displacing said radial member about its pivot to shift said driving member.

10. In a power transmission system, the combination comprising a power supply member, a plurality of coaxial torque transmitting members, a driving member, link means connecting said torque members respectively to said driving member, electromagnetic means stationarily disposed with reference to said torque transmitting member and adapted to interlock the same magnetically with said power supply member, a pivoted radial member carrying said driving member, and a torque-actuated position-controlling device connected to said radial member whereby the position of said driving member is automatically determined.

11. In a power transmission system, the combination comprising a power supply member, a power receiving member, one of said members being composed of a plurality of coaxially oscillatable parts and provided with links connecting the same to the other member, means for shifting one of said members laterally whereby the axes of said members become relatively displaced, and a torque-actuated position-controlling device connected to said shifting means whereby the relative position of said members is automatically determined by the torque transmitted.

12. In a power transmission system, the combination comprising a power supply member, a power receiving member, one of said members being composed of a plurality of coaxially oscillatable parts and provided with links connecting the same to the other member, a pivoted radial member carrying one of said power members and arranged to have a limited arcuate movement whereby the axes of said power members become relatively displaced, and a torque-actuated position-controlling device connected to said radial member whereby the relative position of said power members is automatically determined by the torque transmitted.

13. The method of transmitting power in systems having coupled shafts which comprises dividing the coupling circumference associated with one shaft into a plurality of equally spaced points, and selectively transmitting force through these points to parts associated with the other shaft for predetermined intervals of time.

14. The method of transmitting power in systems having coupled shafts which comprises dividing the coupling circumference associated with one shaft into a plurality of equally spaced points, selectively transmitting force through these points to parts associated with the other shaft for predetermined intervals of time, and shifting said shafts relatively at will to vary the distance between their axes in order to vary their relatively angular velocities.

15. The method of transmitting power in systems having coupled shafts which comprises dividing the coupling circumference associated with one shaft into a plurality of equally spaced points, providing a corresponding number of coaxially oscillatable members linked to said points, and selectively coupling the other shaft to said members for predetermined intervals of time.

16. The method of transmitting power in systems having coupled shafts which comprises dividing the coupling circumference associated with one shaft into a plurality of equally spaced points, providing a corresponding number of coaxially oscillatable members linked to said points, selectively coupling the other shaft to said members for predetermined intervals of time, and shifting said shafts relatively at will to vary the distance between their axes in order to vary their relative angular velocities.

17. The method of transmitting power in systems having coupled shafts which comprises dividing the coupling circumference associated with one shaft into a plurality of equally spaced points, providing a corresponding number of coaxially oscillatable members linked to said points, magnetically coupling the other shaft to said members for predetermined intervals of time, and shifting said shafts relatively to vary the distance between their axes in order to vary their relative angular velocities.

18. The method of transmitting power in systems having coupled shafts which comprises dividing the coupling circumference associated with one shaft into a plurality of equally spaced points, providing a corresponding number of coaxially oscillatable members linked to said points, and magnetically coupling the other shaft to said members without physical contact for predetermined portions of the period of one revolution of said shaft.

19. The method of transmitting power in systems having coupled shafts which comprises dividing the coupling circumference associated with one shaft into a plurality of equally spaced points, providing a corresponding number of coaxially oscillatable members linked to said points, magnetically coupling the other shaft to said members without physical contact for predetermined portions of the period of one revolution of said shaft, and shifting said shafts relatively to vary the distance between their axes when it is desired to vary their relatively angular velocities.

ETHELBERT M. FRASER.